US009950591B2

(12) United States Patent
Kuroda et al.

(10) Patent No.: US 9,950,591 B2
(45) Date of Patent: Apr. 24, 2018

(54) VEHICLE AIR CONDITIONER

(71) Applicant: Panasonic Intellectual Property Management Co., Ltd., Osaka (JP)

(72) Inventors: Kentaro Kuroda, Kanagawa (JP); Yoshitoshi Noda, Kanagawa (JP); Katsuji Taniguchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 14/904,083

(22) PCT Filed: Jul. 23, 2014

(86) PCT No.: PCT/JP2014/003867
§ 371 (c)(1),
(2) Date: Jan. 9, 2016

(87) PCT Pub. No.: WO2015/011919
PCT Pub. Date: Jan. 29, 2015

(65) Prior Publication Data
US 2016/0137032 A1 May 19, 2016

(30) Foreign Application Priority Data

Jul. 26, 2013 (JP) ................. 2013-155181

(51) Int. Cl.
*B60H 1/00* (2006.01)
*B60H 1/08* (2006.01)
(Continued)

(52) U.S. Cl.
CPC .......... *B60H 1/08* (2013.01); *B60H 1/00899* (2013.01); *F25B 6/04* (2013.01); *F25B 25/005* (2013.01);
(Continued)

(58) Field of Classification Search
CPC .................. B60H 1/08; B60H 1/00899; B60H 2001/00928; F25B 25/005
See application file for complete search history.

(56) References Cited

U.S. PATENT DOCUMENTS 6,047,770 A * 4/2000 Suzuki ............... B60H 1/00007
165/202
2001/0052238 A1  12/2001 Burk et al.
(Continued)

FOREIGN PATENT DOCUMENTS

JP  6-143974  5/1994
JP  8-177491  7/1996
(Continued)

OTHER PUBLICATIONS

Description JP2010159008 machine translation.*
International Search Report of PCT application No. PCT/JP2014/003867 dated Nov. 4, 2014.

*Primary Examiner* — Len Tran
*Assistant Examiner* — Gordon Jones
(74) *Attorney, Agent, or Firm* — Pearne & Gordon LLP

(57) ABSTRACT

This vehicle air conditioner includes a first water-refrigerant heat exchanger, a second water-refrigerant heat exchanger, a heater core, a distributing unit which distributes the coolant, fed from a heat generating component of a vehicle, to a plurality of cooling path, and a junction unit which causes the coolant guided from a plurality of cooling paths to join, and feeds the coolant to the heat generating component. The first water-refrigerant heat exchanger inputs the coolant distributed by the distributing unit, through a first cooling path, and feeds the coolant to be guided to the junction unit, to a second cooling path. The second water-refrigerant heat exchanger inputs the coolant distributed by the distributing unit, through a third cooling path, and feeds the coolant to the heater core. The heater core inputs the coolant fed by the (Continued)

second water-refrigerant heat exchanger, and feeds the coolant to be guided to the junction unit, to a fourth cooling path.

12 Claims, 6 Drawing Sheets

(51) Int. Cl.
    *F25B 6/04*     (2006.01)
    *F25B 25/00*     (2006.01)
    *B60K 11/02*     (2006.01)

(52) U.S. Cl.
    CPC .... *B60H 2001/00928* (2013.01); *B60K 11/02* (2013.01); *F25B 2339/047* (2013.01)

(56) References Cited

U.S. PATENT DOCUMENTS

2005/0178523 A1*   8/2005   Itoh .................... B60H 1/00385
                                                                165/42
2008/0041071 A1*   2/2008   Itoh .................... B60H 1/00342
                                                                 62/79
2011/0167850 A1*   7/2011   Itoh .................... B60H 1/00914
                                                                62/160
2011/0214627 A1     9/2011   Nishikawa et al.
2012/0017637 A1     1/2012   Nakajo et al.
2013/0298851 A1    11/2013   Nishikawa et al.
2014/0041826 A1*   2/2014   Takeuchi .................. B60L 1/02
                                                                165/10

FOREIGN PATENT DOCUMENTS

| JP | 10-076837 | 3/1998 |
| JP | 11-034640 | 2/1999 |
| JP | 2006-321389 | 11/2006 |
| JP | 2006-327428 | 12/2006 |
| JP | 2010-159008 | 7/2010 |
| JP | 2011-183867 | 9/2011 |

* cited by examiner

VEHICLE AIR CONDITIONER

CROSS-REFERENCE TO RELATED APPLICATIONS

This application is a U.S. national stage application of the PCT International Application No. PCT/JP2014/003867 filed on Jul. 23, 2014, which claims the benefit of foreign priority of Japanese patent application 2013-155181 filed Jul. 26, 2013, the contents all of which are incorporated herein by reference.

TECHNICAL FIELD

The present disclosure relates to a vehicle air conditioner.

BACKGROUND

Conventionally, a hot water heater which warms an interior of a vehicle by using heat of engine coolant whose temperature has become high is usually adopted for a vehicle heater. Further, a heat pump cooler which cools air fed to an interior of a vehicle by using a low-temperature refrigerant of a heat pump is generally adopted for a conventional vehicle cooler.

Unexamined Japanese Patent Publication No. 10-76837 discloses a vehicle air conditioner which can enhance heating performance compared to a conventional vehicle air conditioner by using a heat pump based on a conventional hot water heater and adding a configuration of heating coolant of a hot water heater.

SUMMARY

A vehicle air conditioner according to one aspect of the present disclosure includes: a first water-refrigerant heat exchanger which performs a heat exchange between a low-temperature and low-pressure refrigerant and a coolant for heat transportation, and vaporizes the refrigerant; a second water-refrigerant heat exchanger which performs a heat exchange between a high-temperature and high-pressure refrigerant and the coolant, and condenses the refrigerant. The vehicle air conditioner further includes: a heater core which heats an interior of a vehicle by using heat of the high-temperature and high-pressure refrigerant discharged by a compressor; a distributing unit which distributes the coolant, fed from a heat generating component of the vehicle, to a plurality of cooling paths; and a junction unit which causes the coolant guided from the plurality of cooling paths to join, and feeds the coolant to the heat generating component. The first water-refrigerant heat exchanger inputs the coolant distributed by the distributing unit, through a first cooling path of the plurality of cooling paths, feeds the coolant to be guided to the junction unit, to a second cooling path of the plurality of cooling paths, and feeds the refrigerant to the compressor. The second water-refrigerant heat exchanger inputs the coolant distributed by the distributing unit, through a third cooling path of the plurality of cooling paths, feeds the coolant to the heater core, and inputs the high-temperature and high-pressure refrigerant from the compressor. The heater core inputs the coolant fed by the second water-refrigerant heat exchanger, and feeds the coolant to be guided to the junction unit, to a fourth cooling path of the plurality of cooling paths.

DESCRIPTION OF EMBODIMENT

Prior to the description of an exemplary embodiment of the present disclosure, problems intent to solve are described as follows.

The vehicle air conditioner of Unexamined Japanese Patent Publication No. 10-76837 employs a configuration where coolant which cools an engine passes in order of a condenser, a heater core, and an evaporator in series, and is guided again to the engine. A conventional vehicle air conditioner employs a configuration where cooling water passes through a plurality of components in series, and therefore has a problem that a flow resistance becomes great. As a result, it is necessary to enhance performance of a pump which circulates coolant.

The present disclosure provides a vehicle air conditioner which can reduce a flow resistance.

An exemplary embodiment of the present disclosure will be described below in detail with reference to the drawings.

Figure 1:
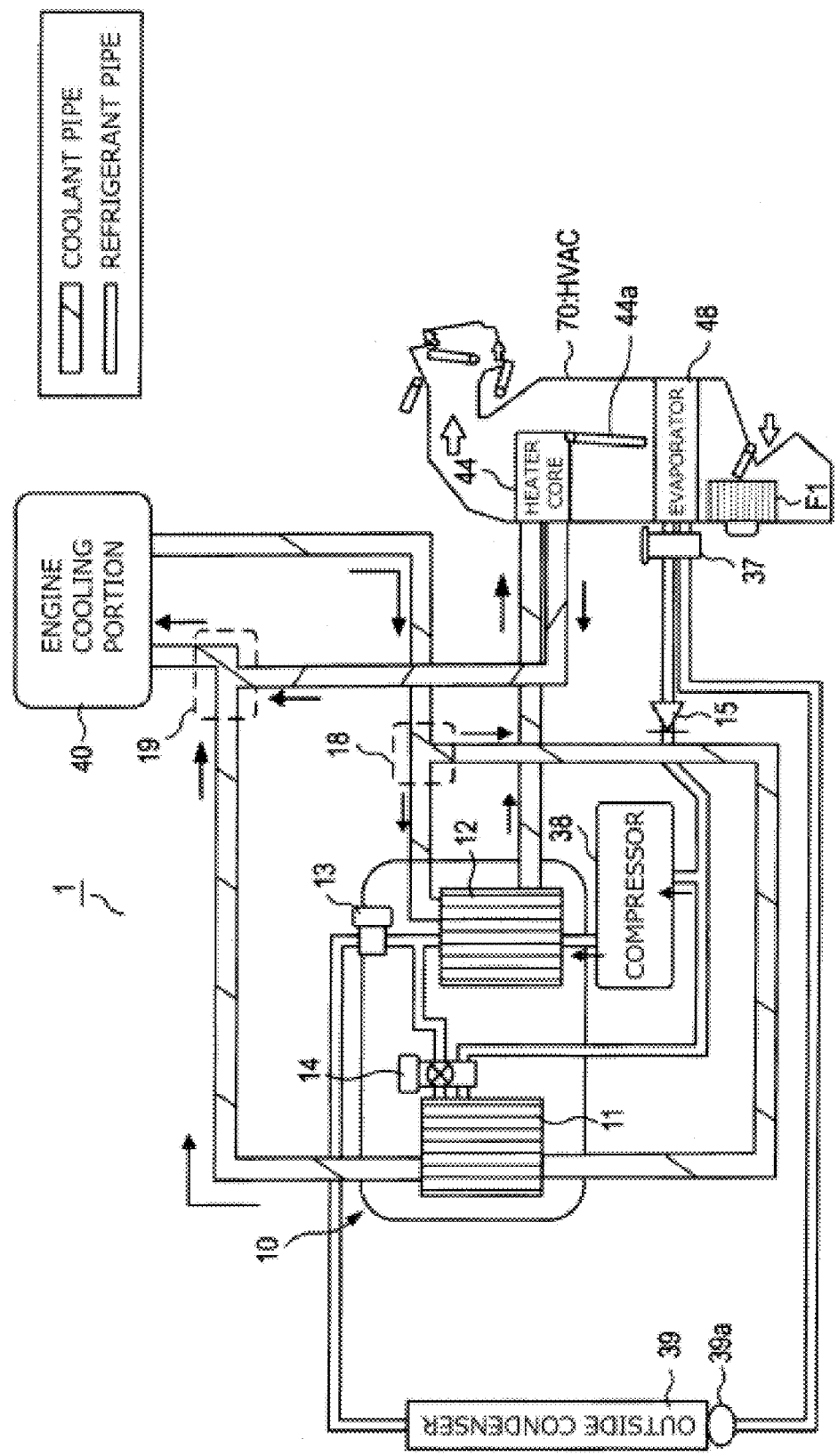
FIG. 1 is a configuration diagram of a vehicle air conditioner according to an exemplary embodiment of the present disclosure.

FIG. 1 is a configuration diagram of a vehicle air conditioner according to the exemplary embodiment of the present disclosure.

Vehicle air conditioner 1 according to the exemplary embodiment of the present disclosure is a device which is mounted on a vehicle including an engine (internal combustion engine) as a heat generating component, and adjusts air condition in the vehicle.

Vehicle air conditioner 1 according to the exemplary embodiment includes constituent unit 10, compressor (compressing machine) 38, engine cooling portion 40, heater core 44, evaporator 48, expansion valve 37, outside condenser 39, check valve 15, coolant pipes which connect these components, and a refrigerant pipe. Heater core 44 and evaporator 48 are disposed in a suction air path of HVAC (Heating, Ventilation, and Air Conditioning) 70. HVAC 70 is provided with fan F1 which causes a suction air to flow.

Compressor 38 is driven by power of an engine or electricity, and compresses a suctioned refrigerant to a high-temperature and high-pressure refrigerant and discharges the refrigerant. The compressed refrigerant is fed to constituent unit 10. Compressor 38 suctions a low-pressure refrigerant through a junction pipe from evaporator 48 or first water-refrigerant heat exchanger 11 of constituent unit 10.

Engine cooling portion 40 includes a water jacket which causes a coolant to flow in surroundings of the engine, and a pump which causes the coolant to flow in the water jacket, and radiates heat from the engine to the coolant flowing in the water jacket. The pump is rotated by, for example, power of the engine. Engine cooling portion 40 may include a radiator which radiates heat to outside air when the amount of heat released from the engine is large. A coolant path of engine cooling portion 40 passes through constituent unit 10 and continues to heater core 44.

The coolant is, for example, an antifreeze liquid such as an LLC (Long Life Coolant) and is a liquid for heat transportation.

A configuration of transporting the coolant may include only the pump of engine cooling portion 40. Consequently, it is possible to reduce the cost of the vehicle air conditioner and reduce an installation space for the vehicle air conditioner. To enhance performance of transporting the coolant, a pump may be added to another portion of the coolant pipe.

Heater core 44 is a device which performs a heat exchange between a coolant and air, and is disposed in a suction air path of HVAC 70 which supplies air to the interior of the vehicle. Heater core 44 receives a supply of the heated coolant, and radiates heat on a suction air fed to the interior of the vehicle (an air-blast to the interior of the vehicle) in a heating operation. Heater core 44 can adjust the amount of air which passes according to an opening of door 44a. Door 44a can be electrically controlled to open and close. Door 44a is also referred to as a mix door.

Evaporator 48 is a device which performs a heat exchange between a low-temperature and low-pressure refrigerant and air, and is disposed in the suction air path of HVAC 70. Evaporator 48 receives a flow of a low-temperature and low-pressure refrigerant in a cooling operation or a dehumidifying operation, and cools suction air supplied to the interior of the vehicle (an air-blast to the interior of the vehicle).

Expansion valve 37 expands a high-pressure refrigerant to a low-temperature and low-pressure refrigerant, and discharges the refrigerant to evaporator 48. Expansion valve 37 is disposed close to evaporator 48. Expansion valve 37 may have a function of automatically adjusting the amount of refrigerant to discharge according to a temperature of a refrigerant fed from evaporator 48.

Outside condenser 39 includes a path in which a refrigerant flows and a path in which air flows, is disposed at a head of the vehicle in an engine room, and performs a heat exchange between the refrigerant and outside air. Outside condenser 39 receives a flow of a high-temperature and high-pressure refrigerant in the cooling mode and the dehumidifying mode, and releases heat from the refrigerant to outside air. Outside air is blown to outside condenser 39 by, for example, a fan. Reservoir tank 39a may be provided at a side of outside condenser 39 from which the refrigerant is fed.

Constituent unit 10 is an integrated component which is manufactured as a single unit at a factory, and is connected with other components of vehicle air conditioner 1 by pipes in a vehicle assembly process. In constituent unit 10, each component may be contained in one housing and integrated or each component may be integrated by being jointed.

Constituent unit 10 includes first water-refrigerant heat exchanger 11, second water-refrigerant heat exchanger 12, ON-OFF valve (corresponding to first switch) 13, and solenoid valve equipped expansion valve (corresponding to a second switch, an expansion valve having ON-OFF function) 14.

First water-refrigerant heat exchanger 11 (evaporator) includes a path in which the low-temperature and low-pressure refrigerant flows and a path in which a coolant flows, and performs a heat exchange between the refrigerant and the coolant. In first water-refrigerant heat exchanger 11, solenoid valve equipped expansion valve 14 discharges the low-temperature and low-pressure refrigerant in a predetermined operation mode to transfer heat from the coolant to the low-temperature and low-pressure refrigerant. Thus, first water-refrigerant heat exchanger 11 vaporizes the low-temperature and low-pressure refrigerant.

The coolant fed from engine cooling portion 40 is guided to first water-refrigerant heat exchanger 11 and second water-refrigerant heat exchanger 12 through distribution pipe 18 which distributes the coolant to a plurality of cooling paths. Further, the coolant guided from first water-refrigerant heat exchanger 11 and heater core 44 is guided to engine cooling portion 40 through junction pipe 19.

First water-refrigerant heat exchanger 11 inputs a coolant distributed by distribution pipe 18, through a cooling path (first cooling path). That is to say, a coolant inlet of first water-refrigerant heat exchanger 11 is connected with the first cooling path. Further, first water-refrigerant heat exchanger 11 feeds the coolant to be guided to junction pipe 19, through a cooling path (second cooling path). Furthermore, the refrigerant inlet of first water-refrigerant heat exchanger 11 is connected to solenoid valve equipped expansion valve 14 through a pipe, and the refrigerant outlet is connected to a pipe which joins a suction port of compressor 38.

Second water-refrigerant heat exchanger 12 (condenser) includes a path in which the high-temperature and high-pressure refrigerant flows and a path in which a coolant flows, and performs a heat exchange between the refrigerant and the coolant. Second water-refrigerant heat exchanger 12 inputs a coolant distributed by distribution pipe 18, through a cooling path (third cooling path). That is to say, a coolant inlet of second water-refrigerant heat exchanger 12 is connected with the third cooling path. Further, second water-refrigerant heat exchanger 12 feeds the coolant to heater core 44. That is to say, a coolant outlet of second water-refrigerant heat exchanger 12 is connected with an inlet of heater core 44.

The refrigerant inlet of second water-refrigerant heat exchanger 12 is connected to a discharge port of compressor 38 through a pipe, and the refrigerant outlet is connected to ON-OFF valve 13 and solenoid valve equipped expansion valve 14 through a branching pipe. Second water-refrigerant heat exchanger 12 receives a flow of the high-temperature and high-pressure refrigerant fed from compressor 38 in an operation mode when the temperature of the cooling water is low, and releases heat to the coolant from the high-temperature and high-pressure refrigerant. When the temperature of the cooling water is low, second water-refrigerant heat exchanger 12 condenses the high-temperature and high-pressure refrigerant.

Heater core 44 inputs the coolant fed by second water-refrigerant heat exchanger 12. Further, heater core 44 feeds the coolant to be guided to junction pipe 19, through a cooling path (fourth cooling path). That is to say, an outlet of heater core 44 is connected with the fourth cooling path.

ON-OFF valve 13 is a valve which is, for example, electrically controlled to open and close a refrigerant pipe. ON-OFF valve 13 is, for example, a solenoid valve.

Solenoid valve equipped expansion valve 14 is a valve which is, for example, electrically controlled to switch to open or close the refrigerant pipe, and functions as an expansion valve when the refrigerant pipe is opened. Solenoid valve equipped expansion valve 14 may be a thermal expansion valve (TXV) which automatically adjusts a refrigerant flow rate based on a refrigerant temperature of the refrigerant outlet of first water-refrigerant heat exchanger 11 when functioning as the expansion valve.

Check valve 15 is a valve which is provided between compressor 38 and evaporator 48, and prevents a reverse flow of the refrigerant in an operation mode in which the refrigerant does not flow to outside condenser 39 and evaporator 48. In this regard, an operation mode in which ON-OFF valve 13 is closed and the refrigerant flows to a refrigerant circuit which passes through first water-refrigerant heat exchanger 11 and second water-refrigerant heat exchanger 12 will be considered. In this operation mode, ON-OFF valve 13 is closed, and therefore the refrigerant circuit passing through outside condenser 39 and evaporator 48 is interrupted. However, even in this case, when the temperature of outside air is low, a refrigerant pressure in outside condenser 39 and evaporator 48 lowers in some cases. Further, when the pressure lowers in this way, the refrigerant flowing to the refrigerant circuit passing through first water-refrigerant heat exchanger 11 and second water-refrigerant heat exchanger 12 reversely flows to the refrigerant circuit passing through evaporator 48. As a result, the amount of refrigerant in the refrigerant circuit passing through first water-refrigerant heat exchanger 11 and second water-refrigerant heat exchanger 12 deviates from an optimal range, and efficiency of this heat pump cycle lowers. However, check valve 15 is provided, so that it is possible to avoid such inconvenience.

Next, an operation of vehicle air conditioner 1 will be described.

Vehicle air conditioner 1 operates by being switched to some operation modes such as a hot water heating mode, a heat pump heating mode, a temperature-adjusting mode, and a cooling mode. The hot water heating mode is a mode of heating the interior of the vehicle without operating the heat pump. The heat pump heating mode is a mode of heating the interior of the vehicle by operating the heat pump. The cooling mode is a mode of cooling the interior of the vehicle by an operation of the heat pump. Further, it is also possible to select a temperature-adjusting mode of adjusting the temperature and the humidity of air by optionally cooling and dehumidifying air by using the low-temperature refrigerant, and heating air by using the high-temperature coolant. The heat pump heating mode and the cooling mode will be described below as typical examples.

[Heat Pump Heating Mode]

Figure 2:
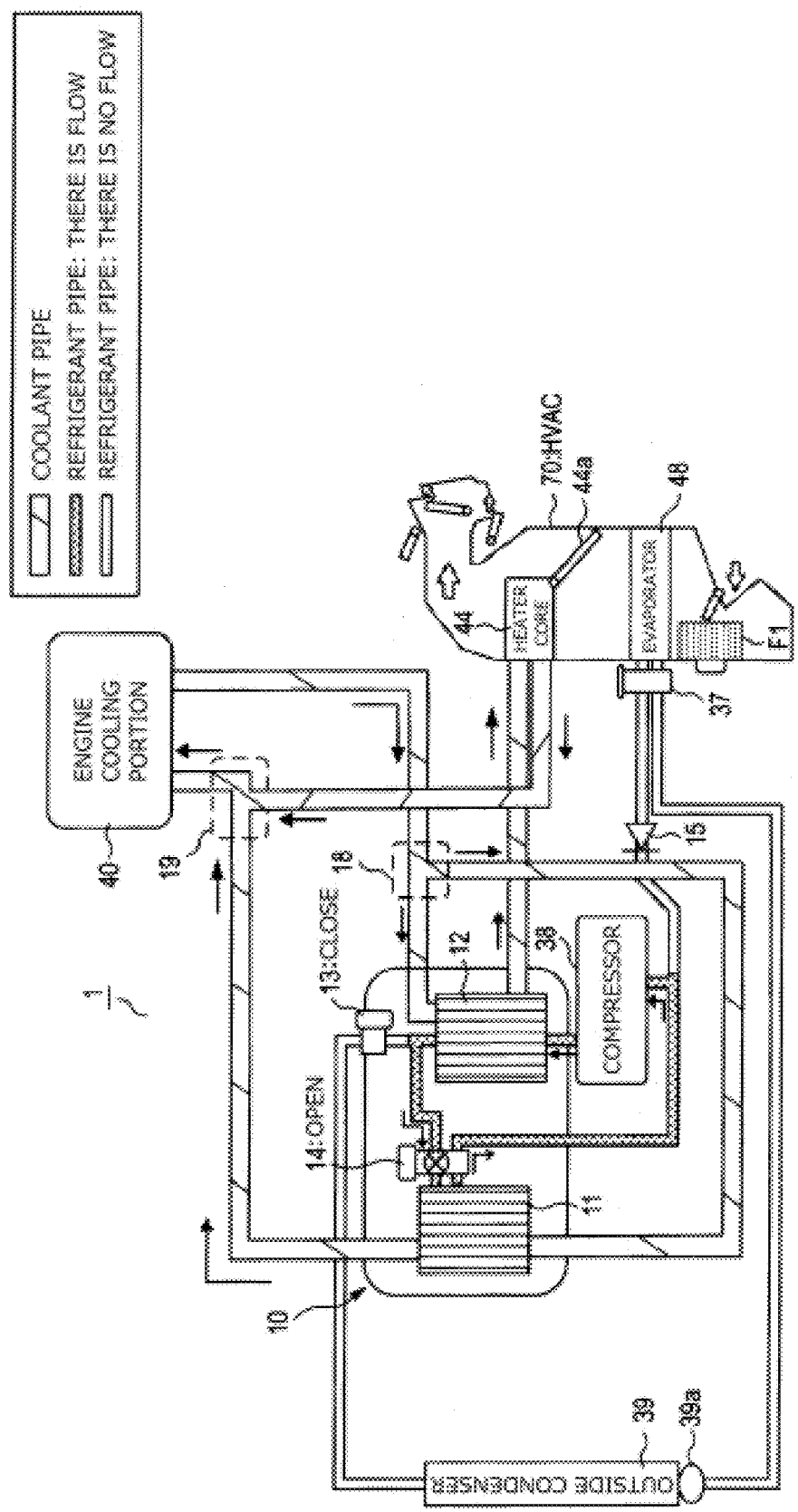
FIG. 2 is a diagram for illustrating an operation of a heat pump heating mode.

FIG. 2 is a diagram for illustrating an operation of a heat pump heating mode.

According to the heat pump heating mode, as illustrated in FIG. 2, ON-OFF valve 13 is switched to close, and solenoid valve equipped expansion valve 14 is switched to open (thermal expansion valve operation). Further, door 44a of heater core 44 is opened (fully opened, for example).

Furthermore, when compressor 38 operates, the refrigerant circulates in order of second water-refrigerant heat exchanger 12, solenoid valve equipped expansion valve 14, first water-refrigerant heat exchanger 11, and compressor 38.

In this regard, the high-temperature and high-pressure refrigerant compressed by compressor 38 releases heat to the coolant in second water-refrigerant heat exchanger 12, and the refrigerant condenses. The condensed refrigerant is expanded as the low-temperature and low-pressure refrigerant by solenoid valve equipped expansion valve 14, and is fed to first water-refrigerant heat exchanger 11. The low-temperature and low-pressure refrigerant absorbs heat from the coolant in first water-refrigerant heat exchanger 11, and the refrigerant vaporizes. The vaporized low-pressure refrigerant is suctioned and compressed by compressor 3.

The coolant circulates in order of engine cooling portion 40, distribution pipe 18, second water-refrigerant heat exchanger 12, and heater core 44, passes through junction pipe 19, and returns to engine cooling portion 40.

In this regard, the coolant having heat absorbed from the engine in engine cooling portion 40 is further heated by second water-refrigerant heat exchanger 12 and is fed to heater core 44. In heater core 44, the coolant whose temperature has become high can sufficiently heat suction air fed to the interior of the vehicle.

Further, the coolant circulates in order of engine cooling portion 40, distribution pipe 18, and first water-refrigerant heat exchanger 11, passes through junction pipe 19, and returns to engine cooling portion 40. First water-refrigerant heat exchanger 11 releases heat to the refrigerant and vaporizes the refrigerant. The coolant having been cooled by first water-refrigerant heat exchanger 11 is fed to engine cooling portion 40 and can sufficiently cool the engine.

In this operation, it is possible to sufficiently warm the interior of the vehicle.

[Cooling Mode]

Figure 3:
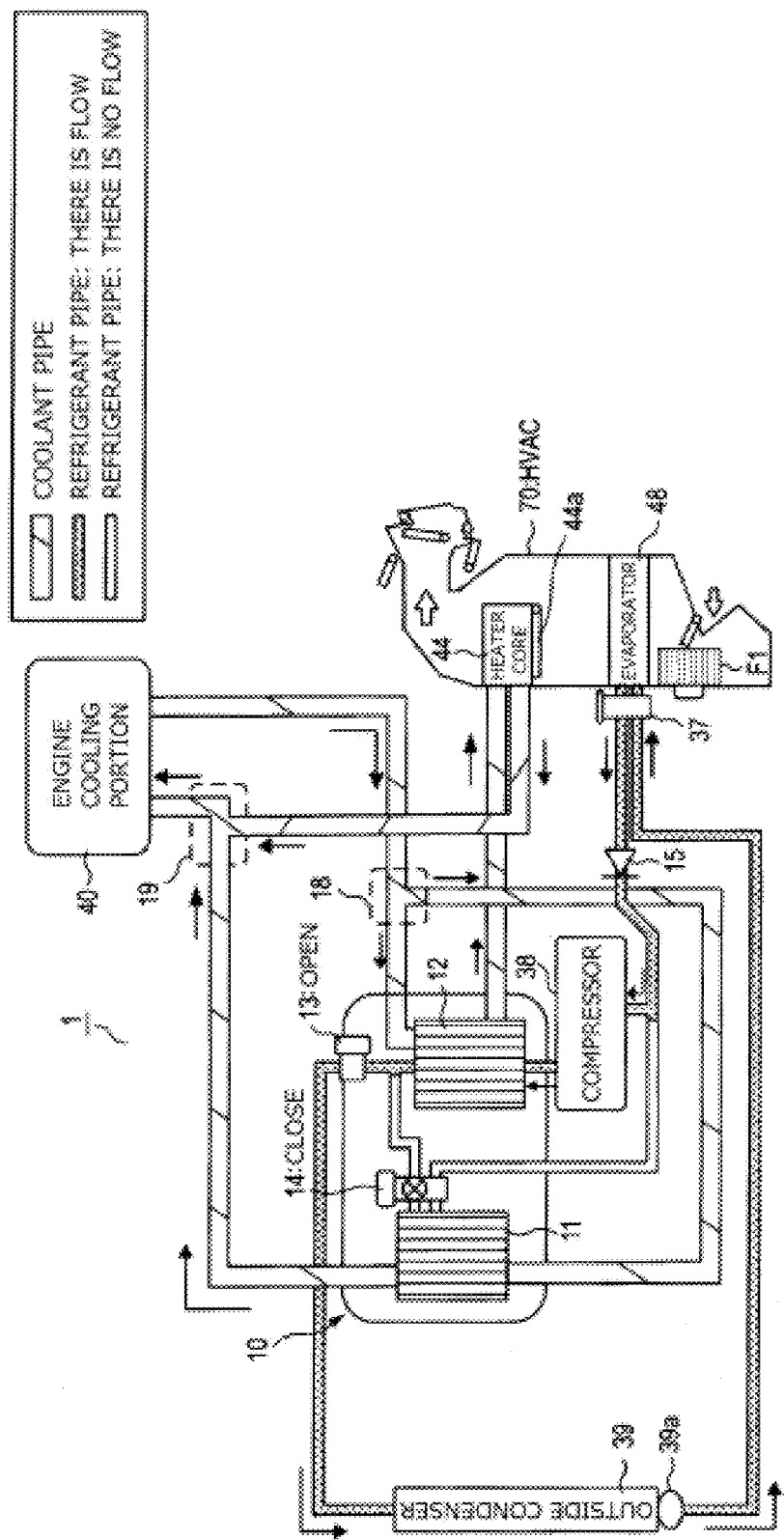
FIG. 3 is a diagram for illustrating an operation of a cooling mode.

FIG. 3 is a diagram for illustrating an operation of the cooling mode.

In the cooling mode, as illustrated in FIG. 3, ON-OFF valve 13 is switched to open and solenoid valve equipped expansion valve 14 is switched to close. Further, door 44a of heater core 44 is fully closed.

Furthermore, when compressor 38 operates, the refrigerant circulates in order of second water-refrigerant heat exchanger 12, outside condenser 39, expansion valve 37, evaporator 48, and compressor 38.

The coolant is not cooled in first water-refrigerant heat exchanger 11, and therefore has a relatively higher temperature. Heat is released from the coolant mainly by a radiator of engine cooling portion 40. The temperature of the engine becomes very high, and therefore even when the temperature of outside air is high, it is possible to adequately cool the interior of the vehicle by heat release from the radiator. In this regard, a configuration in which the coolant flows may make a more coolant flow to the radiator than to heater core 44 by lowering a flow to heater core 44.

An amount of heat radiation from the high-temperature and high-pressure refrigerant is not large in second water-refrigerant heat exchanger 12, because the temperature of the coolant in second water-refrigerant heat exchanger 12 becomes high. The high-temperature and high-pressure refrigerant is fed to outside condenser 39, and then condenses by radiating heat to air in outside condenser 39.

The condensed refrigerant is fed toward evaporator 48. The refrigerant, at first, expands at expansion valve 37 to become a low-temperature and low-pressure refrigerant, and then cools an air-blast to the interior of the vehicle at evaporator 48. The refrigerant is vaporized by this heat exchange. The vaporized low-pressure refrigerant is suctioned and compressed by compressor 38.

The temperature of the coolant flowing in second water-refrigerant heat exchanger 12, heater core 44, and first water-refrigerant heat exchanger 11 becomes high. However, an amount of heat radiation to suction air fed to the interior of the vehicle can be adjusted by adjusting an opening of door 44a of heater core 44.

According to this operation, it is possible to sufficiently cool the interior of the vehicle.

As described above, vehicle air conditioner 1 according to the present embodiment includes distribution pipe 18 and junction pipe 19. Thus, the coolant can pass through first water-refrigerant heat exchanger 11, in parallel with second water-refrigerant heat exchanger 12 and heater core 44. With this configuration, it is possible to reduce a flow resistance.

As a result, it is possible to lower performance of the pump of engine cooling portion 40 which causes an engine coolant to flow.

Further, vehicle air conditioner 1 according to the present exemplary embodiment employs a basic configuration including a configuration of a hot water heater which causes an engine coolant to flow to heater core 44 to use for heating, and a configuration of a heat pump cooler which uses a low-temperature and low-pressure refrigerant of the heat pump for cooling. Furthermore, by adding constituent unit 10 to this basic configuration, it is possible to warm the interior of the vehicle by using the heat pump. With this configuration, even when the temperature of the engine is low, the operation of the heat pump makes it possible to quickly warm the interior of the vehicle with small energy.

That is to say, according to the present disclosure, it is possible to employ a basic configuration including a hot water heater which is adopted for a conventional vehicle, and a heat pump cooler which is adopted for a conventional vehicle, and can enhance heating performance by using a common compressor and a refrigerant in cooling and heating.

Generally, when the temperature of outside air is high and the interior of the vehicle needs to be cooled by the operation of the heat pump, a thermal contact between the high-temperature and high-pressure refrigerant compressed by compressor 38 and the coolant considered to be avoided. However, in the present exemplary embodiment, it has been focused on that the temperature of the coolant is already high in second water-refrigerant heat exchanger 12, and therefore a thermal contact between the refrigerant and the coolant does not cause a significant influence. Further, even in a cooling operation, flows of the coolant and the refrigerant to second water-refrigerant heat exchanger 12 are not bypassed, and a bypass configuration is not employed. Consequently, it is possible to simplify a pipe configuration, reduce a number of components of vehicle air conditioner 1, and reduce the manufacturing cost.

MODIFIED EXAMPLE

Figure 4:
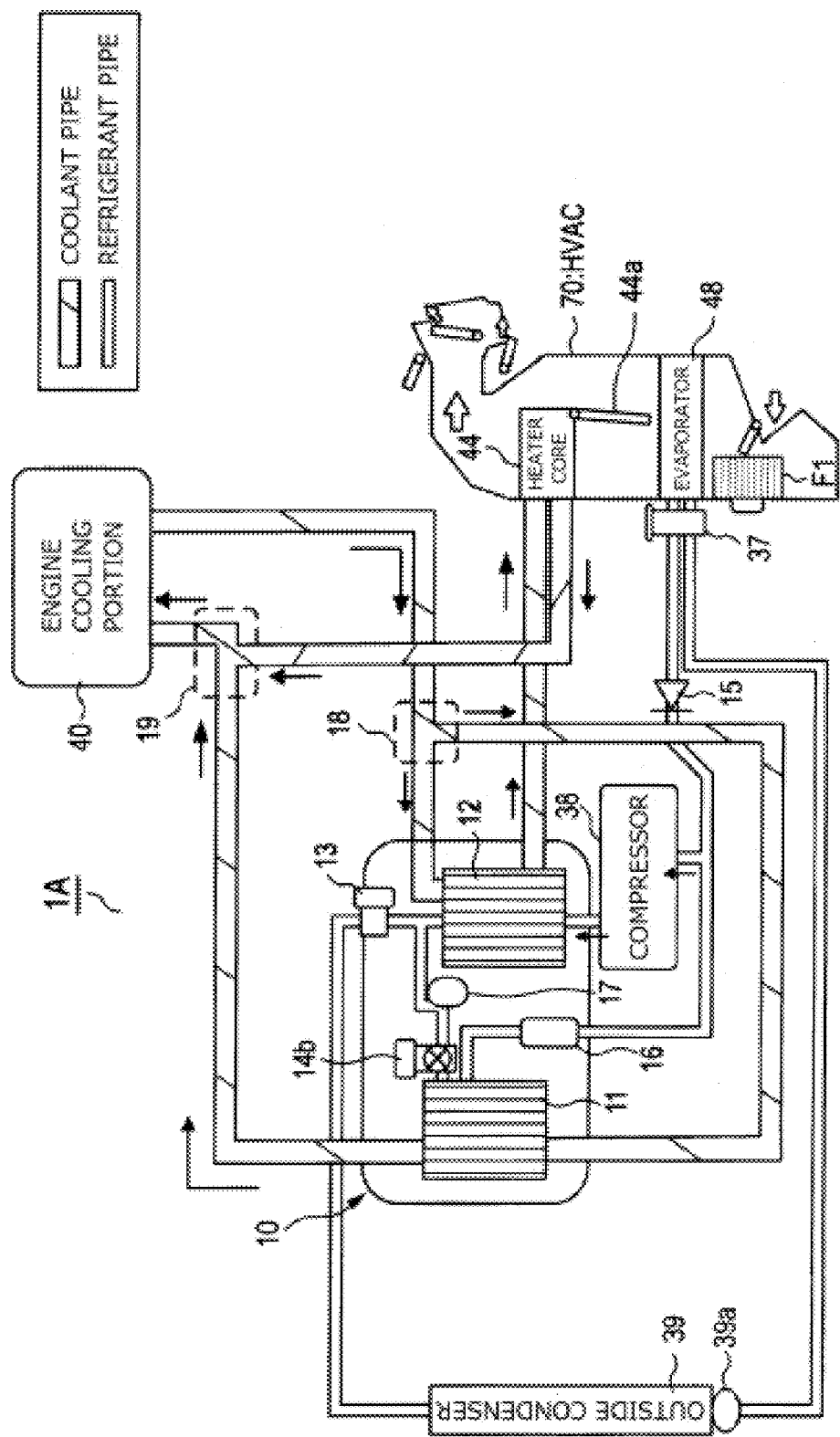
FIG. 4 is a configuration diagram of a vehicle air conditioner according to a modified example of the exemplary embodiment of the present disclosure.

FIG. 4 is a configuration diagram of a vehicle air conditioner according to the modified example of the exemplary embodiment of the present disclosure.

In this modified example, two changes are added to the exemplary embodiment in FIG. 1. The same components as those components in FIG. 1 will be assigned the same reference numerals and will not be described in detail.

A first change is that vehicle air conditioner 1A according to the modified example includes liquid tank 17 disposed on a refrigerant path between second water-refrigerant heat exchanger 12 and first water-refrigerant heat exchanger 11. More specifically, liquid tank 17 is provided between a branching portion of a refrigerant path at the refrigerant outlet side of second water-refrigerant heat exchanger 12, and an expansion valve (14b) at a refrigerant inlet side of first water-refrigerant heat exchanger 11.

In addition, liquid tank 17 may be provided at any position as long as the position lies between the refrigerant outlet of second water-refrigerant heat exchanger 12 and the expansion valve of solenoid valve equipped expansion valve 14b. Liquid tank 17 may be formed integrally with second water-refrigerant heat exchanger 12.

Optimal amounts of refrigerant which circulates at a refrigerant cycle are different between in a cooling operation and in a heating operation. Liquid tank 17 can absorb this difference in the amounts of refrigerant.

A second change is that vehicle air conditioner 1A according to the modified example includes, as a solenoid valve equipped expansion valve 14b, a configuration in which a refrigerant expands by flowing through a refrigerant path (e.g. an orifice) which is limited throughput of the refrigerant to a certain amount (this configuration is referred to as an orifice equipped solenoid valve).

Further, vehicle air conditioner 1A according to the modified example includes accumulator 16 disposed on the refrigerant path between first water-refrigerant heat exchanger 11 and compressor 38, corresponding to a configuration of expanding the refrigerant through the refrigerant path limited throughput of the refrigerant to a certain amount. In the configuration of expanding the refrigerant by causing the refrigerant to flow through the path limited the throughput to a certain amount, the refrigerant having passed through first water-refrigerant heat exchanger 11 is not sufficiently vaporized in some cases. Therefore, a refrigerant of a vapor phase is separated by accumulator 16 and is fed to compressor 38.

Vehicle air conditioner 1A according to the modified example can cool and warm the interior of the vehicle at the same cycle as the above described cycle.

In addition, the vehicle air conditioner according to the modified example may employ a configuration to which only the first change is applied or a configuration to which only the second change is applied.

MODIFIED EXAMPLE

Figure 5:
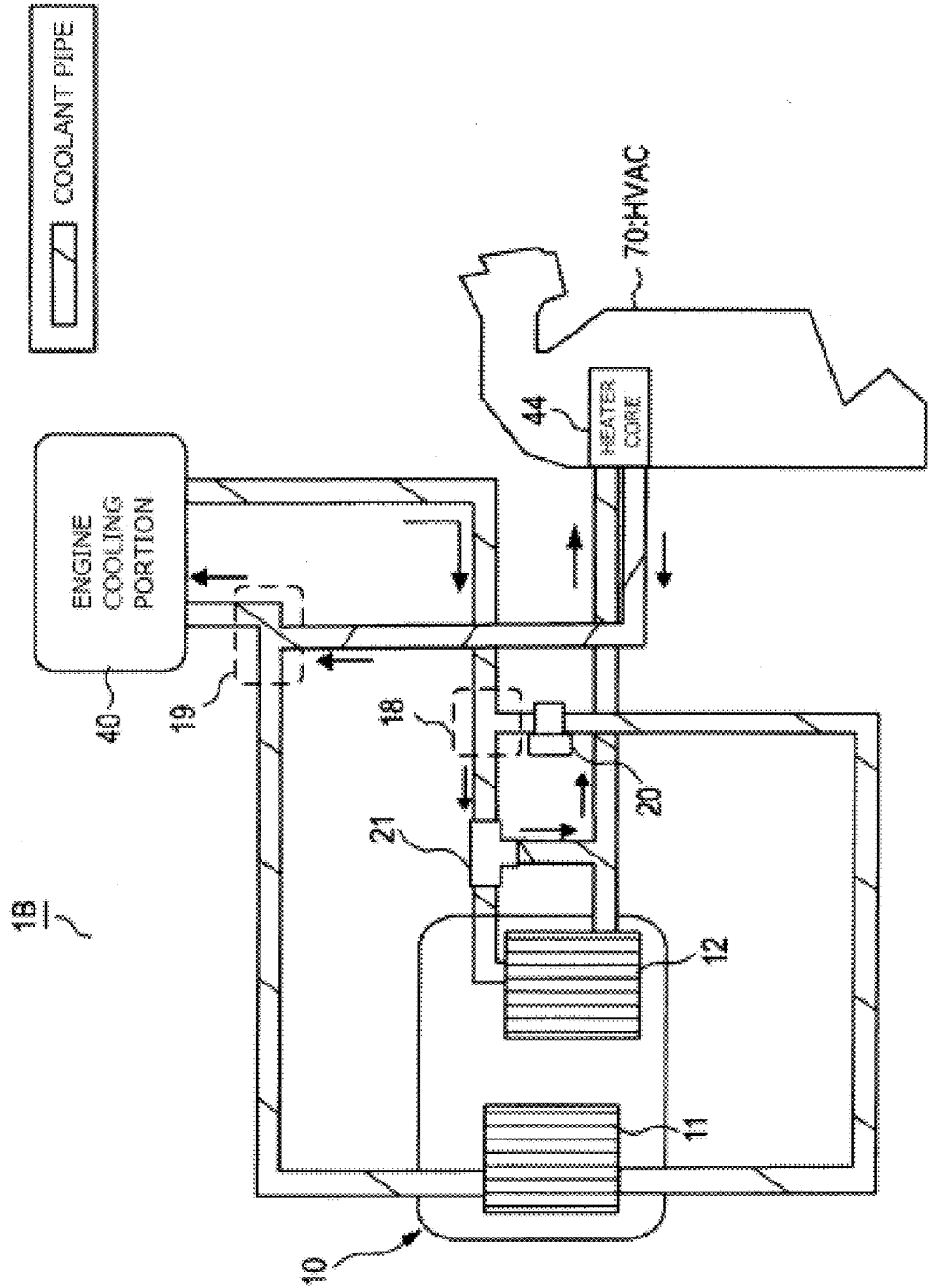
FIG. 5 is a configuration diagram of a vehicle air conditioner according to a modified example of the exemplary embodiment of the present disclosure.

FIG. 5 is a configuration diagram of a vehicle air conditioner according to the modified example of the exemplary embodiment of the present disclosure.

According to this modified example, two changes are added to the exemplary embodiment in FIG. 1. A refrigerant route is not illustrated. The same components as those components in FIG. 1 will be assigned the same reference numerals and will not be described in detail.

A first change is that vehicle air conditioner 1B according to the modified example includes three-way valve 21 on a third cooling path through which a coolant distributed by distribution pipe 18 is guided to second water-refrigerant heat exchanger 12.

Three-way valve 21 has a function of selectively feeding the coolant distributed by distribution pipe 18 to one of the coolant inlet of second water-refrigerant heat exchanger 12 and a path of the coolant fed by second water-refrigerant heat exchanger 12.

Further, a second change is that vehicle air conditioner 1B according to the modified example includes ON-OFF valve 20 which adjusts a flow rate of the coolant and is provided on a first cooling path through which a coolant distributed by distribution pipe 18 is guided to first water-refrigerant heat exchanger 11.

It is possible to provide the following effect by providing ON-OFF valve 20. By adjusting an opening of ON-OFF valve 20, it is possible to adjust a flow rate of an engine coolant which passes through the first cooling path. As a result, it is possible to adjust a ratio of flow rates of engine coolants of the first cooling path and the third cooling path.

It is possible to adjust the ratio of the flow rates in this way and, consequently, maintain an optimal cycle in response to a temperature change in outside air, and enhance air conditioning performance.

Further, it is possible to adjust the ratio of flow rates when a refrigerant pressure is high. Consequently, by adjusting a flow rate of an engine coolant guided to first water-refrigerant heat exchanger 11 to a small flow rate, the temperature of the engine coolant passing through first water-refrigerant heat exchanger 11 lowers, and a pressure to suction the refrigerant of compressor 38 lowers. Thus, it is possible to reduce the pressure to discharge the refrigerant of compressor 38 and, consequently, it is not necessary to intermittently operate compressor 38. As a result, it is possible to enhance comfortability of passengers.

Further, it is possible to adjust a ratio of flow rates, and, consequently, a size of first water-refrigerant heat exchanger 11 can be the same as that of second water-refrigerant heat exchanger 12. Thus, it is possible to reduce the manufacturing cost.

The reasons are following. A large temperature difference cannot be obtained due to an upper limit of a refrigerant saturated pressure though second water-refrigerant heat exchanger 12 needs to receive more heat than that of first water-refrigerant heat exchanger 11. Therefore it is necessary to make a size of second water-refrigerant heat exchanger 12 larger than that of first water-refrigerant heat exchanger 11. However, by adjusting the ratio of flow rates between the heat exchangers, the heat exchangers each having the same size can form a stable cycle.

In addition, a case where ON-OFF valve 20 is provided on the first cooling path through which a coolant is guided to first water-refrigerant heat exchanger 11 has been described. By providing ON-OFF valve 20 on at least one of the first cooling path and the third cooling path through which the coolant is guided to second water-refrigerant heat exchanger 12, it is possible to obtain the same effect as the above described effect.

Further, by varying pipe diameters of the first cooling path and the third cooling path with each other, instead of providing ON-OFF valve 20, it is also possible to adjust a ratio of flow rates of coolants. This configuration can also provide the same effect as the effect provided by providing ON-OFF valve 20.

Further, by varying pipe diameters of the second cooling path and the fourth cooling path with each other, instead of providing ON-OFF valve 20, it is also possible to adjust a ratio of flow rates of coolants. This configuration can also provide the same effect as the effect provided by providing ON-OFF valve 20.

It is possible to provide the following effect by providing three-way valve 21 and ON-OFF valve 20.

By setting three-way valve 21 to feed an engine coolant distributed by distribution pipe 18 to a path of the coolant fed by second water-refrigerant heat exchanger 12 and switching ON-OFF valve 20 to a closed state, the engine coolant does not pass through second water-refrigerant heat exchanger 12. The engine coolant is directly guided to heater core 44, and can perform heating without using a heat pump.

MODIFIED EXAMPLE

Figure 6:
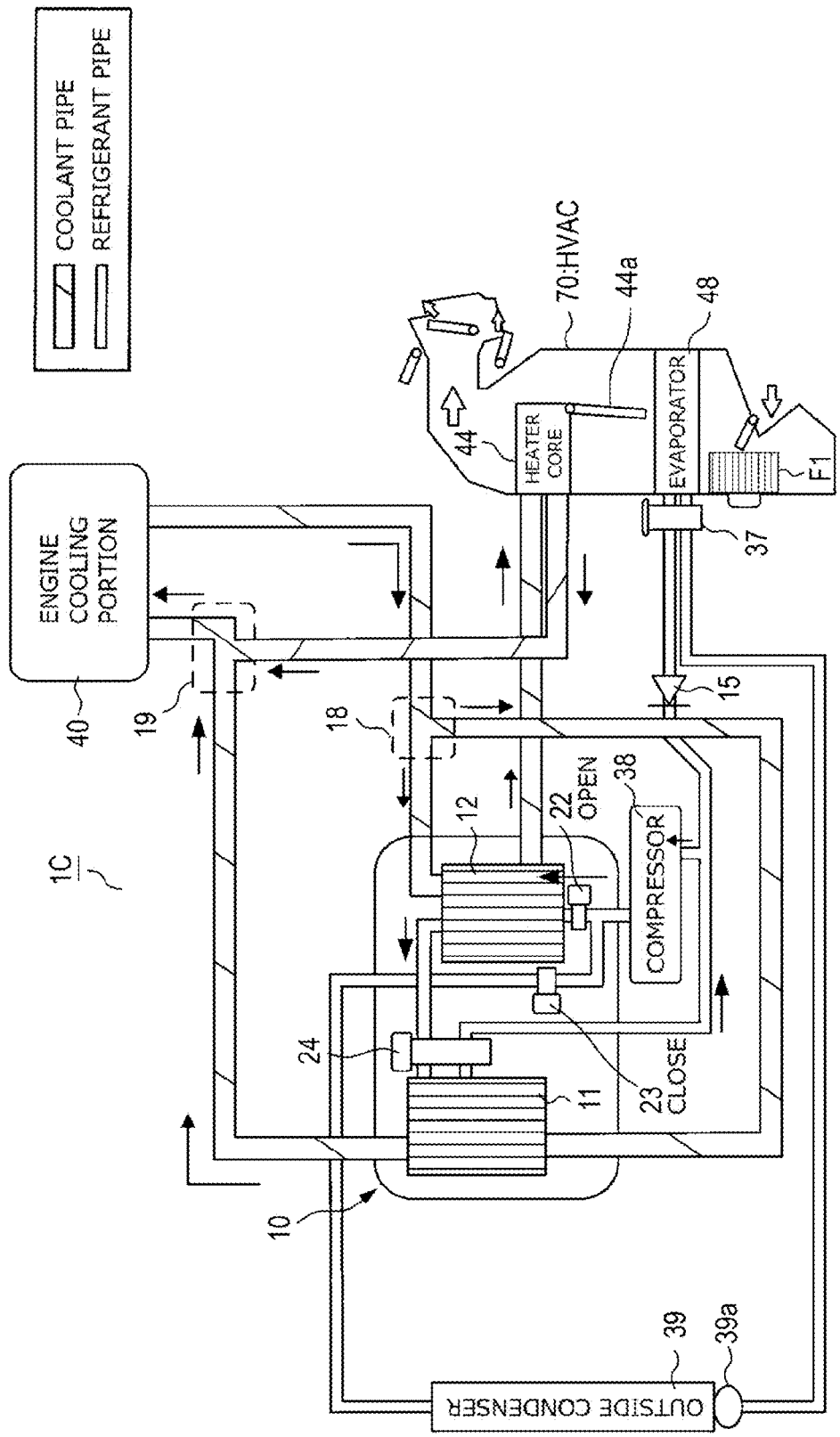
FIG. 6 is a configuration diagram of a vehicle air conditioner according to a modified example of the exemplary embodiment of the present disclosure.

FIG. 6 is a configuration diagram of a vehicle air conditioner according to the modified example of the exemplary embodiment of the present disclosure.

In this modified example, a change of a refrigerant path is added to the exemplary embodiment in FIG. 1. The same components as those components in FIG. 1 will be assigned the same reference numerals and will not be described in detail.

In FIG. 1, the refrigerant inlet of second water-refrigerant heat exchanger 12 is connected to a discharge port of compressor 38 through a pipe, and the refrigerant outlet of second water-refrigerant heat exchanger 12 is connected to ON-OFF valve 13 and solenoid valve equipped expansion valve 14 through a branching pipe. By contrast with this, in vehicle air conditioner 1C according to the modified example, a discharge port of compressor 38 is connected to ON-OFF valve 22 and ON-OFF valve 23 through a branching pipe. The refrigerant inlet of second water-refrigerant heat exchanger 12 is connected to a discharge port of compressor 38 through ON-OFF valve 22. The refrigerant outlet of second water-refrigerant heat exchanger 12 is connected to a refrigerant inlet of first water-refrigerant heat exchanger 11 through expansion valve 24. The refrigerant outlet of first water-refrigerant heat exchanger 11 is connected to a pipe which joins a suction port of compressor 38.

Further, the discharge port of compressor 38 is connected to a refrigerant inlet of outside condenser 39 through a branching pipe and ON-OFF valve 23 in order. Thus, a refrigerant path from second water-refrigerant heat exchanger 12 to first water-refrigerant heat exchanger 11, and a refrigerant path from outside condenser 39 to evaporator 48 are different refrigerant paths.

In the heat pump heating mode, as illustrated in FIG. 6, ON-OFF valve 22 is switched to open and ON-OFF valve 23 is switched to close. Further, door 44a of heater core 44 is opened (fully opened, for example).

Furthermore, when compressor 38 operates, the refrigerant discharged by compressor 38 circulates in order of second water-refrigerant heat exchanger 12, expansion valve 24, first water-refrigerant heat exchanger 11, and compressor 38.

In the cooling mode, ON-OFF valve 22 is switched to close, and ON-OFF valve 23 is switched to open. Further, door 44a of heater core 44 is fully closed.

Furthermore, when compressor 38 operates, the refrigerant discharged by compressor 38 circulates in order of outside condenser 39, expansion valve 37, evaporator 48, and compressor 38.

It is possible to provide the following effect by employing the configuration illustrated in FIG. 6. A refrigerant path from second water-refrigerant heat exchanger 12 to first water-refrigerant heat exchanger 11, and a refrigerant path from outside condenser 39 to evaporator 48 are different. Consequently, it is possible to tune the refrigerant paths differently according to a plurality of operation modes to match a plurality of operation modes (e.g. the cooling mode and the heat pump heating mode). Further, vehicle air conditioner 1C according to the modified example includes expansion valve 24 which expands a refrigerant before the refrigerant reaches first water-refrigerant heat exchanger 11, and expansion valve 37 which expands the refrigerant before the refrigerant reaches evaporator 48. Consequently, it is possible to tune the expansion valve differently according to a plurality of different operation modes to match a plurality of operation modes.

According to the modified example, a heat exchange is performed between air and a refrigerant in the cooling mode, and a heat exchange is performed between a coolant and a refrigerant in a heat pump heating mode. However, it is possible to perform tuning according to a plurality of operation modes, and, consequently, it is possible to exhibit operation performance dedicated to each operation mode. Further, it is possible to smoothly switch an operation mode. Furthermore, there is a problem described below when the refrigerant path from second water-refrigerant heat exchanger 12 to first water-refrigerant heat exchanger 11, and the refrigerant path from outside condenser 39 to evaporator 48 are partially common. In this configuration, it is difficult to collect the refrigerant since the refrigerant accumulates in outside condenser 39 upon switching of the operation mode, and the amount of refrigerant becomes unstable. However, vehicle air conditioner 1C according to the modified example hardly causes such a problem.

In addition, the modified example described with reference to FIGS. 4, 5 and 6 can be combined with each other. The exemplary embodiment of the present disclosure has been described above.

In addition, a configuration where solenoid valve equipped expansion valves 14, 14b are adopted as second switches has been described as an example in the above exemplary embodiment. However, a configuration where a solenoid ON-OFF valve and an expansion valve may be separately provided and connected by a pipe may be employed as the second switch. Further, a configuration where ON-OFF valve 13 is provided to constituent unit 10 has been described as an example in the above exemplary embodiment. However, ON-OFF valve 13 may be provided outside constituent unit 10.

Furthermore, a configuration where ON-OFF valve 13 and solenoid valve equipped expansion valves 14 are adopted as a first switch and a second switch has been described as an example in the above exemplary embodiment. However, functions of ON-OFF valve 13 and a solenoid valve of solenoid valve equipped expansion valve 14 can be realized by a three-way valve disposed at a branching portion of the refrigerant pipe which branches from the refrigerant outlet of second water-refrigerant heat exchanger 12 toward outside condenser 39 and toward first water-refrigerant heat exchanger 11.

Further, the engine has been described as an example of a heating generating component of the vehicle in the above exemplary embodiment. However, the heating generating component of the vehicle may adopt various heating generating components such as an electric motor of an electric vehicle for driving or a rechargeable battery which supplies power for driving.

Disclosures of the description, the drawings and the abstract included in Japanese Patent Application No. 2013-155181 filed on Jul. 26, 2013, are entirely incorporated in this application.

The present disclosure can be used for a vehicle air conditioner which is mounted on various vehicles such as engine cars, electric vehicles, or HEV.

The invention claimed is:

1. A vehicle air conditioner comprising:
a first water-refrigerant heat exchanger which performs a heat exchange between a low-temperature and low-pressure refrigerant and a coolant for heat transportation, and vaporizes the refrigerant;
a second water-refrigerant heat exchanger which performs a heat exchange between a high-temperature and high-pressure refrigerant and the coolant, and condenses the refrigerant;
a heater core which heats an interior of a vehicle by using heat of the high-temperature and high-pressure refrigerant discharged by a compressor;
a distributing unit which distributes the coolant, fed from a heat generating component of the vehicle, to a plurality of cooling paths; and
a junction unit which joins the coolant guided from the plurality of cooling paths, and feeds the coolant to the heat generating component;
an evaporator which performs a heat exchange between the low-temperature and low-pressure refrigerant and suction air fed to the interior of the vehicle;
a condenser which releases heat from the high-temperature and high-pressure refrigerant to outside air and condenses the refrigerant; and
a switch,
wherein
the first water-refrigerant heat exchanger inputs the coolant distributed by the distributing unit, through a first cooling path of the plurality of cooling paths, feeds the coolant to be guided to the junction unit, to a second cooling path of the plurality of cooling paths, and feeds the refrigerant to the compressor,
the second water-refrigerant heat exchanger inputs the coolant distributed by the distributing unit, through a third cooling path of the plurality of cooling paths, feeds the coolant to the heater core, and inputs the high-temperature and high-pressure refrigerant from the compressor,
the heater core inputs the coolant fed by the second water-refrigerant heat exchanger, and feeds the coolant to be guided to the junction unit, to a fourth cooling path of the plurality of cooling paths, and
the switch can switch between a first state and a second state,
in the first state, the refrigerant flows along the compressor, the second water-refrigerant heat exchanger, and the first water-refrigerant heat exchanger in this order, and
in the second state, the refrigerant flows along the compressor, the second water-refrigerant heat exchanger, the condenser, and the evaporator in this order.

2. The vehicle air conditioner according to claim 1, wherein a pipe diameter of the first cooling path and a pipe diameter of the third cooling path are different.

3. The vehicle air conditioner according to claim 1, further comprising a three-way valve disposed on the third cooling path, wherein the three-way valve feeds the refrigerant distributed by the distributing unit to one of an inlet of the coolant of the second water-refrigerant heat exchanger and a path of the coolant fed by the second water-refrigerant heat exchanger.

4. The vehicle air conditioner according to claim 1, wherein an ON-OFF unit which adjusts a flow rate of the coolant is disposed on at least one of the first cooling path and the third cooling path.

5. The vehicle air conditioner according to claim 1, wherein the switch includes:
a first switch which can switch between a state where the refrigerant fed from the second water-refrigerant heat exchanger is fed to an evaporator which cools an air blast to the interior of the vehicle by using the refrigerant, and a state where the refrigerant is not fed to the evaporator; and
a second switch which can switch between a state where the refrigerant fed from the second water-refrigerant heat exchanger is fed to the first water-refrigerant heat exchanger, and a state where the refrigerant is not fed to the first water refrigerant exchanger.

6. The vehicle air conditioner according to claim 5, wherein the first switch and the second switch can switch at least between a state of a cooling mode where the refrigerant flows to a circulation route including the second water-refrigerant heat exchanger, the condenser, the evaporator, and the compressor in this order, and yet the refrigerant does not flow to the first water-refrigerant heat exchanger, and a state of a heat pump heating mode where the refrigerant flows to a circulation route including the second water-refrigerant heat exchanger, the first water-refrigerant heat exchanger, and the compressor in this order.

7. The vehicle air conditioner according to claim 5, further comprising a check valve disposed on a path in which the refrigerant flows from the evaporator to the compressor.

8. The vehicle air conditioner according to claim 5, further comprising:
- a first expander which expands the refrigerant fed from the second water-refrigerant heat exchanger and feeds the expanded refrigerant to the first water-refrigerant heat exchanger; and
- a second expander which expands the refrigerant condensed by the condenser to the low-temperature and low-pressure refrigerant, and discharges the expanded refrigerant to the evaporator.

9. The vehicle air conditioner according to claim 1, further comprising:
- an evaporator which performs a heat exchange between the low-temperature and low-pressure refrigerant and suction air fed to the interior of the vehicle;
- a condenser which releases heat from the high-temperature and high-pressure refrigerant to outside air and condenses the refrigerant; and
- a third switch which can switch between a state where the refrigerant flows to a refrigerant circuit including the compressor, the second water-refrigerant heat exchanger, and the first water-refrigerant heat exchanger, and a state where the refrigerant flows to a refrigerant circuit including the compressor, the condenser, and the evaporator, wherein a refrigerant path from the second water-refrigerant heat exchanger to the first water-refrigerant heat exchanger is different from a refrigerant path from the condenser to the evaporator.

10. The vehicle air conditioner according to claim 9, wherein:
- in a heat pump heating mode, the third switch switches to a state where the refrigerant flows to the refrigerant circuit including the compressor, the second water-refrigerant heat exchanger, and the first water-refrigerant heat exchanger, and
- in a cooling mode, the third switch switches to a state where the refrigerant flows to the refrigerant circuit including the compressor, the condenser, and the evaporator.

11. The vehicle air conditioner according to claim 9, further comprising a check valve disposed on a path in which the refrigerant flows from the evaporator to the compressor.

12. The vehicle air conditioner according to claim 9, further comprising:
- a third expander which expands the refrigerant fed from the second water-refrigerant heat exchanger and feeds the expanded refrigerant to the first water-refrigerant heat exchanger; and
- a second expander which expands the refrigerant condensed by the condenser to the low-temperature and low-pressure refrigerant, and discharges the expanded refrigerant to the evaporator.

* * * * *